US006747990B1

(12) United States Patent
Umayabashi et al.

(10) Patent No.: US 6,747,990 B1
(45) Date of Patent: Jun. 8, 2004

(54) PACKET COMMUNICATION SYSTEM, NETWORK-SIDE APPARATUS TO BE USED THEREIN, AND TIME SLOT ALLOCATION CONTROL METHOD

(75) Inventors: Masaki Umayabashi, Tokyo (JP); Kazuo Takagi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/480,218

(22) Filed: Jan. 10, 2000

(30) Foreign Application Priority Data

Jan. 14, 1999 (JP) .......................................... 11-007164

(51) Int. Cl.[7] ................................................ H04J 3/16
(52) U.S. Cl. ........................ 370/468; 370/432; 370/437; 370/412
(58) Field of Search ................................. 370/229, 230, 370/412, 417, 413, 432, 437, 443, 465, 468, 368, 381, 395.41, 395.71, 415, 420, 463, 473

(56) References Cited

U.S. PATENT DOCUMENTS

| 5,936,958 | A | * | 8/1999 | Soumiya et al. ........ 370/395.43 |
| 5,963,541 | A | * | 10/1999 | Koga et al. .................. 370/229 |
| 6,118,762 | A | * | 9/2000 | Nomura et al. .............. 370/230 |
| 6,212,196 | B1 | * | 4/2001 | Momona ...................... 370/449 |
| 6,301,262 | B1 | * | 10/2001 | Peterson ...................... 370/458 |
| 6,385,168 | B1 | * | 5/2002 | Davis et al. ................. 370/230 |
| 6,467,091 | B1 | * | 10/2002 | Lin et al. ..................... 725/126 |
| 6,477,144 | B1 | * | 11/2002 | Morris et al. ............. 370/230.1 |

FOREIGN PATENT DOCUMENTS

| EP | 0889611 | 1/1999 |
| JP | 10-242981 | 9/1998 |
| JP | 10-243981 | 9/1998 |

OTHER PUBLICATIONS

Report of the Electronic Information and Communications Society, SSE 97–175 Feb. 6, 1998, Atsushi Iwamura, et al. "An Examination of the Dynamic Band Allocation Control Method in ATM–PON System," pp. 25–30.

(List continued on next page.)

Primary Examiner—Phirin Sam
(74) Attorney, Agent, or Firm—Dickstein, Shapiro, Morin & Oshinsky, LLP.

(57) ABSTRACT

The one-to-plural communication system for realizing the time slot allocation control method of the invention comprises the terminal-side apparatus 800–830 provided with the buffer 801, the Queue length report function 802, and the output control function 803, and the network-side apparatus 840 provided with the necessary buffer capacity reduction type time slot allocation control function 141. The necessary buffer capacity reduction type time slot allocation control function 141, by using the Queue length information reported from the Queue report function 802, allocates time slots so that Queue lengths in the buffer 801 may become constant as nearly as possible among the terminal-side apparatus 800–830, and reports the results to the output control circuit 803 which controls the output of cells from the buffer 801. Thus, this invention provides, in dynamic time slot allocation control, a time slot allocation control method for reducing the necessary buffer capacity of each terminal-side apparatus, and also a one-to-plural media shared type communication system for realizing it.

36 Claims, 9 Drawing Sheets

OTHER PUBLICATIONS

Collection of the Lectures Delivered at the Grand Assembly of the Electronic and Information Communications society, B–8–53 Mar. 6, 1997, Seigo Miyable et al. "ATM–PON Dynamic Band Allocation System," p. 439.

Collection of the Lectures Delivered at the Grand Assembly of the Electronic and Information Communication Society, B–8–36 Mar. 6, 1998, Seigo Miyabe et al. "ATM–PON Dynamic Band Allocation System," p. 383.

Japanese Office Action issued May 9, 2000 in a related application with English translation of relevant portions of the same.

R. Sigle et al.: "Fair Queueing Wireless ATM MAC protocols," IEEE International Symposium on Personal, Indoor and Mobile Radio Communications, XX, XX., vol. 1, Sep. 8, 1998, pp. 55–59, XP002144260.

* cited by examiner

PACKET COMMUNICATION SYSTEM, NETWORK-SIDE APPARATUS TO BE USED THEREIN, AND TIME SLOT ALLOCATION CONTROL METHOD

FIELD OF THE INVENTION

This invention pertains to a packet communication system, a network-side apparatus to be used therein, and a time slot allocation control method wherein plural terminal-side apparatus are connected with a network-side apparatus sharing physical media, and the network-side apparatus allocates time slots dynamically according to the varying traffic of each terminal-side apparatus.

BACKGROUND OF THE INVENTION

As a prospective system for realizing access network at a low cost, there is a media-shared type one-to-plural communication system wherein plural terminal-side apparatus are connected with one network-side apparatus sharing physical media. As an example of such media-shared type one-to-plural communication system, an ATM-PON (Asynchronous Transfer Mode-Passive Optical Network) system with 4 terminal-side apparatus is shown in FIG. 1. In the ATM-PON system, as shown in FIG. 1, the terminal-side apparatus 800~830 are connected with one network-side apparatus 840 via the optical branch/merger device 860. In such an ATM-PON system, so as to avoid collisions of data (henceforth described as cells) on the transmission line (henceforth described as shared transmission line) 870 between the optical branch/merger device and the network-side apparatus 840, shared by all the terminal-side apparatus connected to the network-side apparatus 840, each of the terminal-side apparatus 800~830 use time slots allocated by the network-side apparatus 840 to transmit cells to the network-side 840. If the network-side apparatus 840 allocates fixed time slots to each of the terminal-side apparatus 800~830, and one accommodates the Best Effort traffic having strong burst characteristics such as Internet service, the transmission capacity of the shared transmission line 870 may not be effectively utilized, because a certain amount of time slots are allocated fixedly in spite of the varying input traffic. Thus, in order to utilize the shared transmission line 870 effectively, the network-side apparatus 840 is required to change the time slot allocation dynamically according to the input state of the traffic to each of the terminal-side apparatus 800~830.

A prior art in which the network-side apparatus changes dynamically the time slot allocation to each of the terminal-side apparatus 800~830 as stated above, is described, for example, in JPAH10-242981, "Dynamic time slot allocation system". With reference to FIG. 1, the time slot allocation control system described in the application above and a media shared type one-to-plural communication system to realize it will be described.

The terminal-side apparatus 800 comprises the Queue length (stored cell number, and hence forth described as Queue length) report function 802, which monitors the buffer 801 for storing input cells from each of terminals 880, 881 and the stored cell numbers in the buffer 801, and reports the Queue length information to the network-side apparatus 840, and to the output control function 803 which controls the output of cells in the buffer 801. Also the terminal-side apparatus 810, 820, and 830 are assumed to have a similar structure. And the network-side apparatus 840 is provided with the Queue length proportional time slot allocation control function 841 which calculates the time slot allocation for each of the terminal-side apparatus 800~830. The terminal-side apparatus 800~830 and the network-side apparatus 840 are connected by the separate transmission lines 850~853 connecting the terminal-side apparatus 800~830 with the optical branch/merger device 860, and by the shared transmission line 870 connecting the optical branch/merger device 860 with the network-side apparatus 840.

In such a structure, cells are transferred from the terminal-side apparatus 800~830 to the network-side apparatus 840 in the operation as will be described below. Cells input from the terminals 880, 881, are stored in the buffer 801, and then transferred to the network-side apparatus 840 by the output control function 803. The output control function 803 uses the time slots allocated by the Queue length proportional time slot allocation control function 841 of the network-side apparatus 840 to output cells to the network-side apparatus 840. The Queue length of the buffer 801 is also monitored by the Queue length report function 802, and the Queue length information is reported to the network-side apparatus 840 by the Queue length report function 802. Cells output from the terminal-side apparatus 800~830 and the Queue length information of the buffer 801 are input to the Queue length proportional time slot allocation control function 841 of the network-side apparatus 840 via the separate transmission lines 850~853, the optical branch/merger device 860, and the shared transmission line 870.

The Queue length proportional time slot allocation control function 841 of the network-side apparatus 840 allocates time slots to each of the terminal-side apparatus 800~830 according to the proportion based on the Queue length information of the buffer 801 reported from the Queue length report function 802. And the information about the allocated time slots is reported to each of the terminal-side apparatus 800~830 by the control signal 890.

As an example, in case Queue lengths of the buffer for each of the terminal-side apparatus are 20, 50, 40, and 10 respectively, and the total time slots allocated to each of the terminal-side apparatus 800~830 is 60, time slot allocation will be described with reference to FIG. 2. In FIG. 2, Queue lengths and allocated time slot numbers in the buffer 801 are shown for each of the terminal-side apparatus 800~830. In this case, the Queue length proportional time slot allocation control circuit 841 allocates the total time slots of 60 to each of the terminal-side apparatus 800~830, according to the Queue length ratio 20:50:40:10 in the buffer 801 for each of the terminal-side apparatus 800~830. Thus the time slot numbers allocated to each of the terminal-side apparatus 800~830, turn out to be 10, 25, 20, 5.

As described as above, in a conventional time slot allocation control system where the time slot is allocated in proportion to the Queue length of each of the terminal-side apparatus, time slot allocation is based on the input state of the traffic to each of the terminal-side apparatus. Thus, transmission capacity of the shared transmission line 870 is effectively utilized.

In a system of the prior-art, when the time slot allocation is changed, the total time slots are allocated to each terminal-side apparatus, according to the proportion of the Queue length of each terminal-side apparatus. Thus, time slots are allocated even to terminal-side apparatus having buffer of short Queue length, and sufficient time slots may not be allocated to terminal-side apparatus having buffer of long Queue length. As a result, there is a problem where buffer capacity necessary may increase so as to satisfy a certain cell loss rate, as the Queue length of buffer having long Queue length increases.

In the conventional allocation methods according to the ratio of Queue lengths, since the ratio of Queue lengths is that of values of the Queue length minus the time slot number allocated, the variance of Queue lengths among each of the terminal-side apparatus is large even in a steady state. The buffer capacity necessary is determined by the longest Queue length of the buffer of all the terminal-side apparatus, and the larger the variance of Queue lengths among terminal-side apparatus, the larger the buffer capacity necessary.

SUMMARY OF THE INVENTION

It is an object of the invention to provide a time slot allocation control method wherein the buffer capacity necessary for the buffer of each terminal-side apparatus may be reduced in a dynamic time slot allocation control, and provide a one-to-plural media shared type communication system to realize it.

According to the first feature of the invention, a packet communication system, wherein plural terminal-side apparatus and a network-side apparatus are connected, sharing physical media, said network-side apparatus allocating time slots to at least one of said terminal-side apparatus, and said terminal-side apparatus transferring packets to the physical media by using said time slots, each of said terminal-side apparatus comprises:

a buffer means for storing packets input from plural terminals connected and a packet number report means which monitors the number of packets presently stored in said buffer means and reports said packet number information to said network-side apparatus, and said network-side apparatus comprising a time slot allocation control means for allocating time slots to each said terminal-side apparatus on the basis of stored packet information from the packet number report means of said terminal devices, and said time slot allocation control means allocates time slots by allocating time slots so that the stored packet number minus the number of time slots allocated to each may approach a specified value.

According to the second feature of the invention, a packet communication system, wherein plural terminal-side apparatus and a network-side apparatus are connected, sharing physical media, said network-side apparatus allocating time slots to at least one said terminal-side apparatus, and said terminal-side apparatus transferring packets to the physical media by using said time slots, each of said terminal-side apparatus comprises:

a buffer means for storing packets input from plural terminals connected and a packet number report means which monitors the number of packets presently stored in said buffer means and reports said packet number information to said network-side apparatus, and said network-side apparatus comprising a time slot allocation control means for allocating time slots to each said terminal-side apparatus on the basis of stored packet information from the packet number report means of said terminal devices, and said time slot allocation control means allocates time slots by allocating time slots so that the variance of the stored packet number minus the number of time slots allocated to each may be minimized.

According to the third feature of the invention, a packet communication system, wherein plural terminal-side apparatus and a network-side apparatus are connected, sharing physical media, said network-side apparatus allocating time slots to at least one of said terminal-side apparatus, and said terminal-side apparatus transferring packets to the physical media by using said time slots, each of said terminal-side apparatus comprises:

a buffer means for storing packets input from plural terminals connected and a packet number report means which monitors the number of packets presently stored in said buffer means and reports said packet number information to said network-side apparatus, and said network-side apparatus comprising a time slot allocation control means for allocating time slots to each said terminal-side apparatus on the basis of stored packet information from the packet number report means of said terminal device, and said time slot allocation control means divides the total time slots allocated for said terminal-side apparatus into time slot groups, allocating time slots so that in each said time slot group, the stored packet number in said terminal-side apparatus minus the number of time slots allocated to each may approach a specified value, adding each said allocated time slot in each said terminal-side apparatus to determine the allocated time slots in said terminal-side apparatus.

According to the fourth feature of the invention, a packet communication system, wherein plural terminal-side apparatus and a network-side apparatus are connected, sharing physical media, said network-side apparatus allocating time slots to at least one said terminal-side apparatus, and said terminal-side apparatus transferring packets to the physical media by using said time slots, each of said terminal-side apparatus comprises:

a buffer means for storing packets input from plural terminals connected and a packet number report means which monitors the number of packets presently stored in said buffer means and reports said packet number information to said network-side apparatus, and said network-side apparatus comprising a time slot allocation control means for allocating time slots to each said terminal-side apparatus on the basis of stored packet information from the packet number report means of said terminal devices, and said time slot allocation control means divides the total time slots allocated for said terminal-side apparatus into time slot groups, allocating time slots so that in each said time slot group, the variance of the stored packet number in said terminal-side apparatus minus the number of time slots allocated to each may be minimized, adding each of said allocated time slots in each said terminal-side apparatus to determine the allocated time slots in said terminal-side apparatus.

According to the fifth feature of the invention, a packet communication system, wherein plural terminal-side apparatus and a network-side apparatus are connected, sharing physical media, said network-side apparatus allocating time slots to at least one said terminal-side apparatus, and said terminal-side apparatus transferring packets to the physical media by using said time slots, each of said terminal-side apparatus comprises:

a buffer means for storing packets input from plural terminals connected and a packet number report means which monitors the number of packets presently stored in said buffer means and reports said packet number information to said network-side apparatus, and said network-side apparatus comprising a time slot allocation control means for allocating time slots to each said terminal-side apparatus on the basis of stored packet information from the packet number report means of said terminal device, and said time slot allocation control means divides the total time slots allocated to said terminal-side apparatus into plural slot groups, allocates time slots so that in at least one of said time slot groups, the stored packet numbers in said terminal-side apparatus minus the time slot numbers allocated may approach a specified value, and in the other time slot groups among said time slot groups, the variance of the stored packet numbers in said terminal-side apparatus minus the time slot numbers allocated may be minimized, adding each said allocated time slot in each said terminal-side apparatus to determine the allocated time slots in said terminal-side apparatus.

According to the sixth feature of the invention, a packet communication system defined in claim 1, wherein in said time slot allocation control means, time slots are allocated in the descending order of stored packet numbers in the terminal-side apparatus when time slots are allocated.

According to the seventh feature of the invention, a packet communication system defined in claim 1, wherein in said time slot allocation control means, terminal-side apparatus for time slot allocation are limited to part of them when time slots are allocated.

According to the eighth feature of the invention, a packet communication system defined in claim 1, wherein when said time slot allocation control means are limited to part of terminal-side apparatus for allocation, terminal-side apparatus which store packets more than a predetermined threshold value are chosen.

According to the ninth feature of the invention, a packet communication system defined in claims 1, wherein when said time slot allocation control means are limited to part of terminal-side apparatus for allocation, a predetermined number of terminal-side apparatus are chosen in the descending order of stored packet numbers.

According to the tenth feature of the invention, a packet communication system defined in claims 1, wherein when said time slot allocation control means are limited to part of terminal-side apparatus for allocation, a predetermined number of terminal-side apparatus are chosen in the descending order of stored packet numbers among those which store packets more than a predetermined threshold value.

According to the eleventh feature of the invention, a packet communication system defined in claim 1, wherein when said time slot allocation control means are limited to part of terminal-side apparatus for allocation, among a predetermined number of terminal-side apparatus in the descending order of stored packet number, terminal-side apparatus with packets more than a predetermined threshold value are chosen According to the twelfth feature of the invention, a packet communication system defined in claim 1, wherein said packets are cells used in the asynchronous transfer mode.

According to the thirteenth feature of the invention, a network-side apparatus wherein it is provided with a stored packet number management table which manages the stored packet number information reported from plural terminal-side apparatus and updates the stored packet number information under management when new packet number information is reported from each said terminal-side apparatus, a circuit for determining terminal-side apparatus for allocation, which gets the stored packet information of each said terminal device with reference to said stored packet number management table when timing arrives for changing time slot allocation and limits terminal-side apparatus for allocation on the basis of the acquired stored packet number information, and a time slot allocation control circuit which when the information of the terminal-side apparatus for allocation is received from said circuit for determining terminal-side apparatus for allocation, gets the stored packet number information of the terminal-side apparatus for allocation with reference to said stored packet number management table, allocates time slots to the terminal-side apparatus for allocation based on the acquired stored packet number information, and reports the allocated time slot information to the terminal-side apparatus.

According to the fourteenth feature of the invention, a network-side apparatus defined in claim 13, wherein the terminal-side apparatus stored with packets more than a predetermined threshold value are chosen, when said circuit for determining terminal-side apparatus for allocation limits terminal-side apparatus for allocation to part of terminal-side apparatus.

According to the fifteenth feature of the invention, a network-side apparatus defined in claim 13, wherein a predetermined number of terminal-side apparatus are chosen in descending order of numbers of stored packets, when said circuit for determining terminal-side apparatus for allocation limits terminal-side apparatus for allocation to part of terminal-side apparatus. 16.A network-side apparatus defined in claim 13, wherein among the terminal-side apparatus stored with packets more than a predetermined threshold value, a predetermined number of terminal-side apparatus are chosen in the descending order of stored packet numbers, when said circuit for determining terminal-side apparatus for allocation limits terminal-side apparatus for allocation to part of terminal-side apparatus.

According to the seventeenth feature of the invention, a network-side apparatus defined in claim 13, characterized in that among a predetermined number of the terminal-side apparatus in the descending order of stored packet numbers, terminal-side apparatus stored with more than a predetermined threshold value are chosen when said circuit for determining terminal-side apparatus for allocation limits terminal-side apparatus for allocation to part of terminal-side apparatus.

According to the eighteenth feature of the invention, a network-side apparatus defined in claim 13, wherein said time slot allocation control circuit allocates time slots so that values of the stored packet numbers of said terminal-side apparatus minus the time slot numbers allocated may approach a specified value.

According to the nineteenth feature of the invention, a network-side apparatus defined in claim 13, wherein said time slot allocation control circuit allocates time slots so that the variance of the stored packet numbers of said terminal-side apparatus minus the time slot numbers allocated may be minimized.

According to the twentieth feature of the invention, a network-side apparatus defined in claim 13, wherein said time slot allocation control circuit divides the total time slots allocated to said terminal-side apparatus into plural time slot groups and allocates time slots so that in each of said time slot group the stored packet numbers of said terminal-side apparatus minus the numbers of time slots allocated may approach a specified value, determining the allocated time slots for said terminal-side apparatus by adding each said time slot allocated to each said terminal device.

According to the twenty-first feature of the invention, a network-side apparatus defined in claim 13, wherein said time slot allocation control circuit divides the total time slots allocated to said terminal-side apparatus into plural time slot groups and allocates time slots so that in each of said time slot group the variance of stored packet numbers of said terminal-side apparatus minus the numbers of time slots allocated may be minimized, determining the allocated time slots for said terminal-side apparatus by adding each said time slot allocated to each said terminal device.

According to the twenty-second feature of the invention, a network-side apparatus defined in claim 13, wherein said time slot allocation control circuit divides the total time slots allocated to said terminal-side apparatus into plural time slot groups, and allocates time slots so that in at least one group of said time slot groups, the stored packet numbers of said terminal-side apparatus minus the numbers of time slots allocated may approach a specified value, and in the other time slot groups of said time slot groups, the variance of stored packet numbers of said terminal-side apparatus minus the numbers of time slots allocated may be minimized, determining the allocated time slots for said terminal-side apparatus by adding each of said time slots allocated to each of said terminal devices.

According to the twenty-third feature of the invention, a network-side apparatus defined in claim 18, wherein said time slot allocation control circuit allocates time slots to terminal-side apparatus in the descending order of stored packet numbers.

According to the twenty-fourth feature of the invention, a network-side apparatus defined in claim 13, further comprises:

a time slot group deterministic circuit which divides the total time slots allocated to said terminal-side apparatus into plural time slot groups to manage them, and an addition circuit which inputs the results of time slot allocation from plural number of said time slot allocation control circuits, adds each allocation result, reporting the added results to each said terminal-side apparatus.

According to the twenty-fifth feature of the invention, a network-side apparatus defined in claim 13, wherein said packets are cells used in the asynchronous transfer mode.

According to the twenty-sixth feature of the invention, a time slot allocation control method wherein plural terminal-side apparatus and network-side apparatus are connected sharing physical media and said network-side apparatus determines the time slot numbers allocated to said terminal-side apparatus, said terminal-side apparatus seek the stored packet numbers in terminal-side apparatus, and said network-side apparatus seeks the time slot numbers for allocation, and time slots are so allocated that said stored packet number minus the time slot number allocated to each may approach a specified value.

According to the twenty-seventh feature of the invention, a time slot allocation control method wherein plural terminal-side apparatus and a network-side apparatus are connected, sharing physical media and said network-side apparatus determines the time slot numbers allocated to said terminal-side apparatus, and said terminal-side apparatus seek the stored packet numbers in the terminal-side apparatus, and said network-side apparatus seeks the time slot numbers, and time slots are so allocated that the variance of said stored packet numbers minus the time slot numbers allocated to each may be minimized.

According to the twenty-eighth feature of the invention, a time slot allocation control method wherein plural terminal-side apparatus and network-side apparatus are connected, sharing physical media, said network-side apparatus determining the time slot numbers allocated to said terminal-side apparatus, said terminal-side apparatus seek the stored packet numbers of terminal-side apparatus, and said network-side apparatus seeks the time slot numbers, and the total time slots are divided into plural time slot groups, and in each said time slot group, time slots are so allocated that the stored packet number of said terminal-side apparatus minus the time slot number allocated to each may approach a specified value, and the allocated time slots for said terminal-side apparatus are determined by adding each said time slot allocated to each said terminal device.

According to the twenty-ninth feature of the invention, a time slot allocation control method wherein plural terminal-side apparatus and network-side apparatus are connected, sharing physical media, said network-side apparatus determining the time slot number allocated to said terminal-side apparatus, said terminal-side apparatus seek the stored packet numbers of terminal-side apparatus, and said network-side apparatus seeks the time slot numbers, and the total time slots are divided into plural time slot groups, and in each said time slot group, time slots are so allocated that the variance of the stored packet numbers of said terminal-side apparatus minus the time slot numbers allocated to each may be minimized, and the allocated time slots for said terminal-side apparatus are determined by adding each said time slot allocated to each said terminal device.

According to the thirtieth feature of the invention, a time slot allocation control method wherein plural terminal-side apparatus and network-side apparatus are connected, sharing physical media, said network-side apparatus determining the time slot number allocated to said terminal-side apparatus, said terminal-side apparatus seek the stored packet numbers of terminal-side apparatus, and said network-side apparatus seeks the time slot numbers, and the total time slots are divided into plural time slot groups, and in at least one of said time slot groups, time slots are so allocated that stored packet number of said terminal-side apparatus minus the time slot number allocated to each may approach a specified value, and in the other time slot groups of said time slot groups, time slots are so allocated that the variance of stored packet numbers of said terminal-side apparatus minus the time slot numbers allocated to each may be minimized, and the allocated time slots for said terminal-side apparatus are determined by adding each said time slot allocated to each said terminal device.

According to the thirty-first feature of the invention, a time slot allocation control method defined in claim 26, wherein time slots are allocated in descending order of number of stored packets in the terminal-side apparatus.

According to the thirty-second feature of the invention, a time slot allocation control method defined in claim 26, wherein said packet allocation is limited to the terminal-side apparatus storing packets more than a preset threshold value.

According to the thirty-third feature of the invention, a time slot allocation control method defined in claim 26, wherein said packet allocation is limited to the terminal-side apparatus of a predetermined number in the descending order of stored packet numbers.

According to the thirty-fourth feature of the invention, a time slot allocation control method defined in claim 26, wherein among the terminal-side apparatus storing packets more than a predetermined threshold value, terminal devices for said packet allocation are limited to those of a predetermined number in the descending order of stored packet numbers.

According to the thirty fifth feature of the invention, a time slot allocation control method defined in claim 26, wherein among the terminal-side apparatus of a predetermined number in the descending order of stored packet number, terminal-side apparatus for said packet allocation are limited to those storing packets more than a predetermined threshold value.

According to the thirty-sixth feature of the invention, a time slot allocation control method defined in claim 26, wherein those said packets are cells used in the asynchronous transfer mode.

BRIEF DESCRIPTION OF THE DRAWINGS

The invention will be explained in more detail in conjunction with the appended drawings, wherein.

DESCRIPTION OF THE PREFERRED EMBODIMENTS

With reference to drawings, embodiments of the invention will be described in details.

First, with reference to the drawings, the first embodiment is described.

Figure 3:
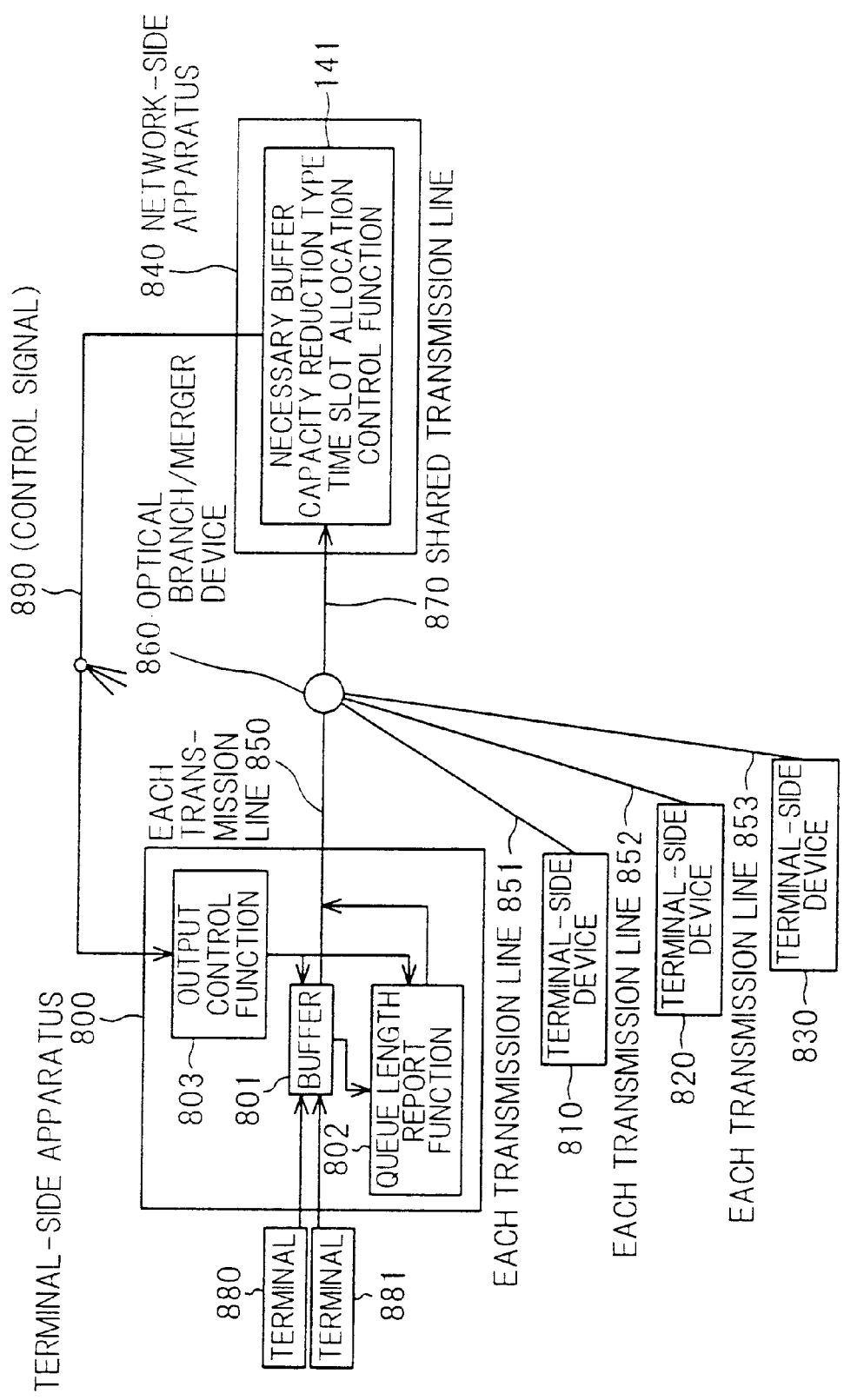
FIG. 3 is a structural diagram of a packet communication system to realize the time slot allocation control methods of this invention.

FIG. 3 is a drawing of the first embodiment showing a packet communication system for realizing the time slot allocation methods of this invention. The same reference numbers are used for those having the same function as in FIG. 3 describing the prior art. In the media shared type one-to plural communication system of the present embodiment, the Queue length proportional time slot allocation control function 841 of the network-side apparatus in FIG. 3 is modified by the necessary buffer capacity reduction type time slot allocation control function 141 in FIG. 3.

In such a structure, cells are transferred from the terminal-side apparatus 800~830 to the network-side apparatus by the following operation. The terminal-side apparatus 800~830 transfer cells from the terminals 880, 881 to the necessary buffer capacity reduction type time slot allocation control function 141 of the network-side apparatus 840 similarly as in the prior art. The necessary buffer capacity reduction type time slot allocation control function 141 allocates time slots to each of terminal-side apparatus 800~830.on the basis of the Queue length information of the buffer 801 reported from the Queue length report function 802, and reports the allocated time slot information to each of the terminal-side apparatus 800~830 with the control signal 890.

Figure 1:
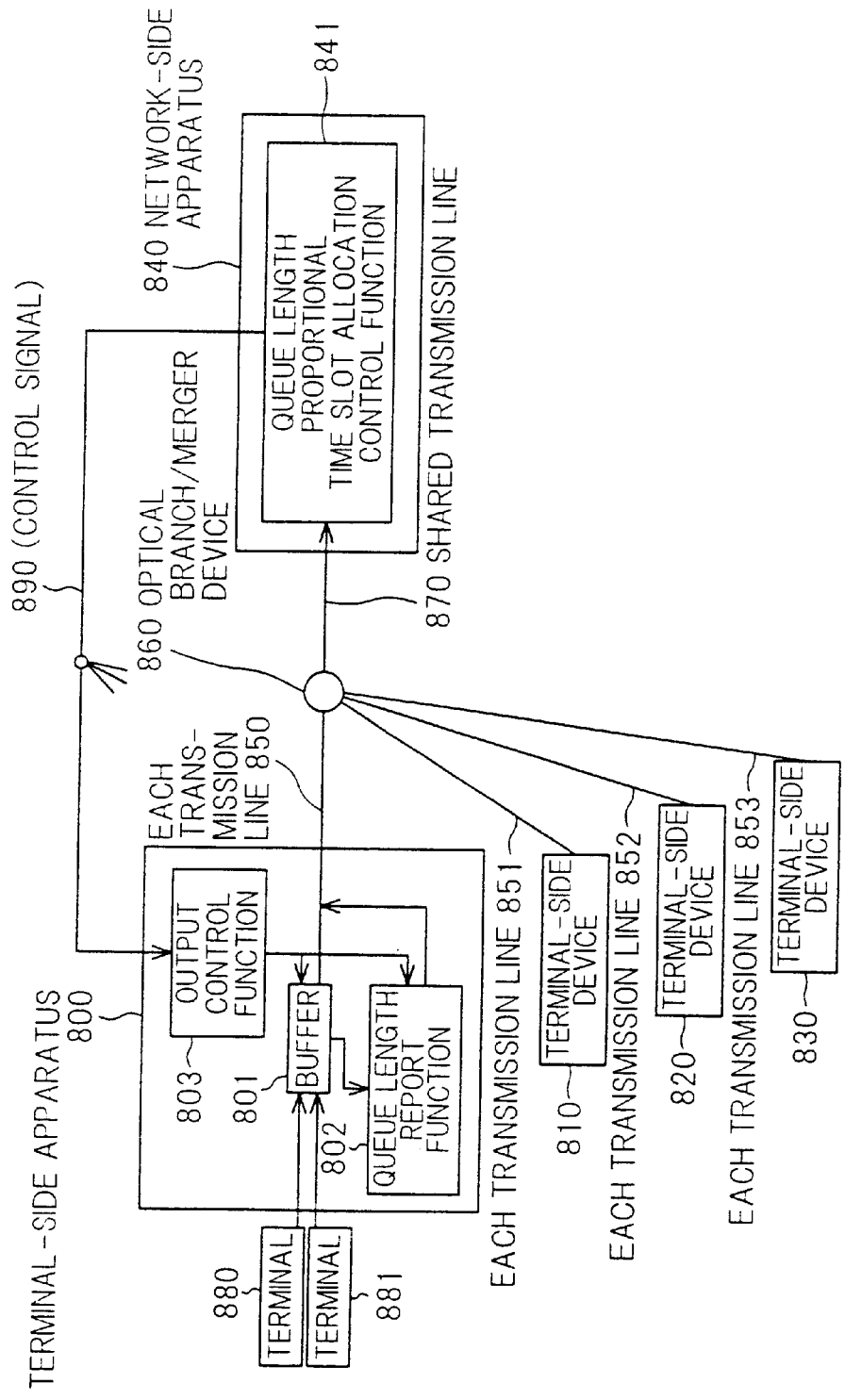
FIG. 1 is a structural diagram of the one-to-plural media shared type communication system to realize a conventional time slot allocation control method.
Figure 2:
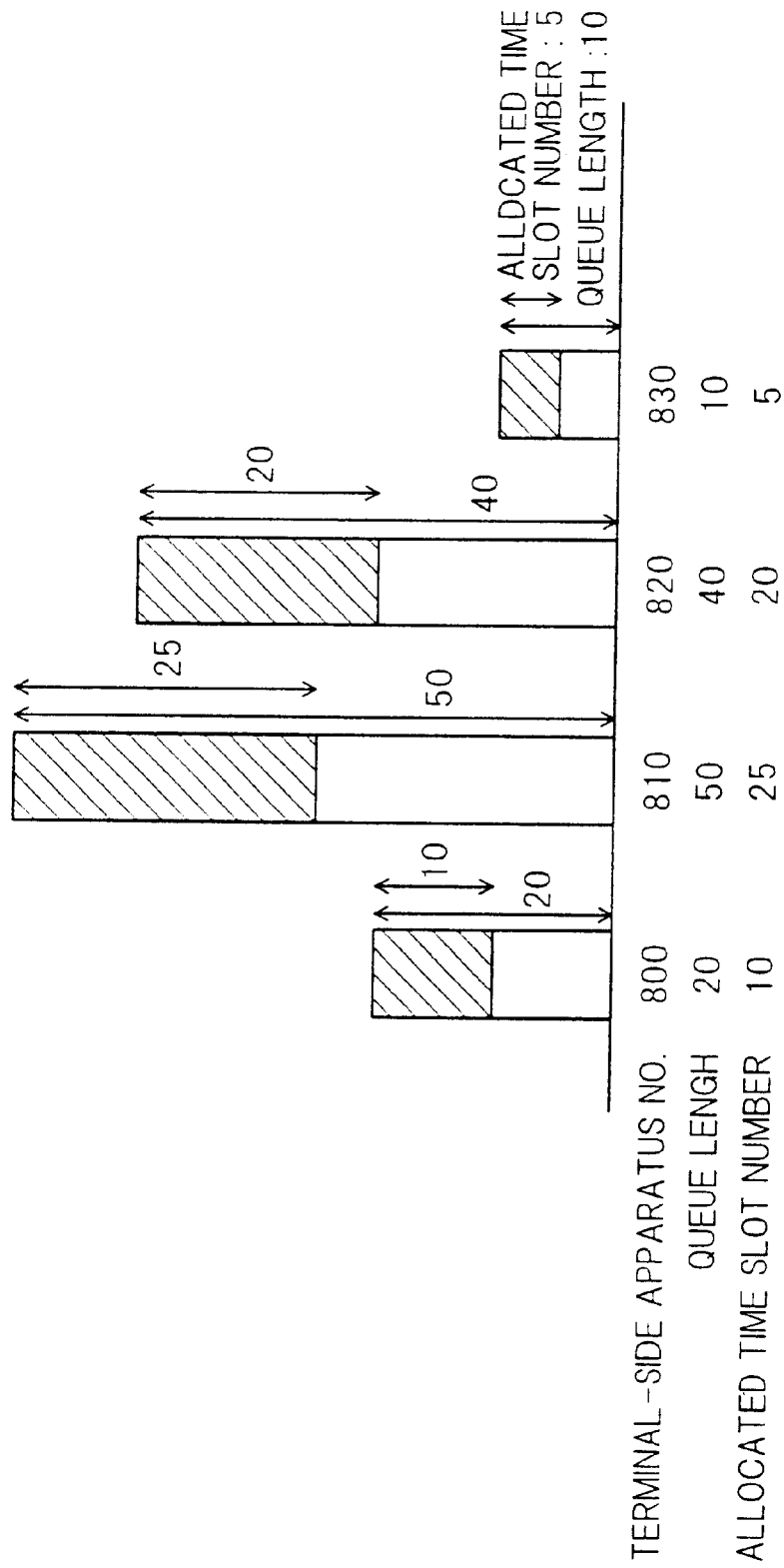
FIG. 2 is a figure showing the time slot allocation method when the conventional time slot allocation control method is applied.

The necessary buffer capacity reduction type time slot allocation control function 141 provides function for reducing the necessary buffer capacity of the buffer 801 for each of the terminal-side apparatus 800~830 by giving priority of the time slot allocation to those of terminal-side apparatus with long Queue length. As the time slot allocation methods of the necessary buffer capacity reduction type time slot allocation control function 141, so as to realize this function, there are the method (henceforth, described as Queue Length Averaging Method) wherein time slots are so allocated that each Queue length among the terminal-side apparatus as objects of allocation 8 henceforth, described as Object Terminal-side apparatus for Allocation) maybe come constant as nearly as possible, in other words, the variance of Queue lengths may be minimized, the method (henceforth, described as Equal Division Allocation Method) wherein time slots are equally allocated among the Object Terminal-side apparatus for Allocation 800~830, and the Queue length proportional allocation method described in the prior art. And when one uses the Queue Length Averaging Method, object terminal-side apparatus for allocation should be all or part of the terminal-side apparatus 800~830, and when one uses the Equal Division Allocation Method or the Queue Length Proportional Allocation Method, object terminal-side apparatus for allocation should be part of the terminal-side apparatus 800~830. With reference to FIGS. 4 to 7, time slot allocation will be described as follows, when the necessary buffer capacity reduction type time slot allocation control function 141 applies said three methods. FIGS. 4 to 7 show the Queue lengths of the buffer 801 for each of terminal-side apparatus 800~830 and the allocated time slot numbers, as in FIG. 2.

In the following description, it is assumed that the Queue lengths of the buffer 801 for each of the terminal-side apparatus 800~830 are 20, 50, 40, and 10 respectively, and the total slot number allocated to each of terminal-side apparatus 800~830 is 60.

Figure 4:
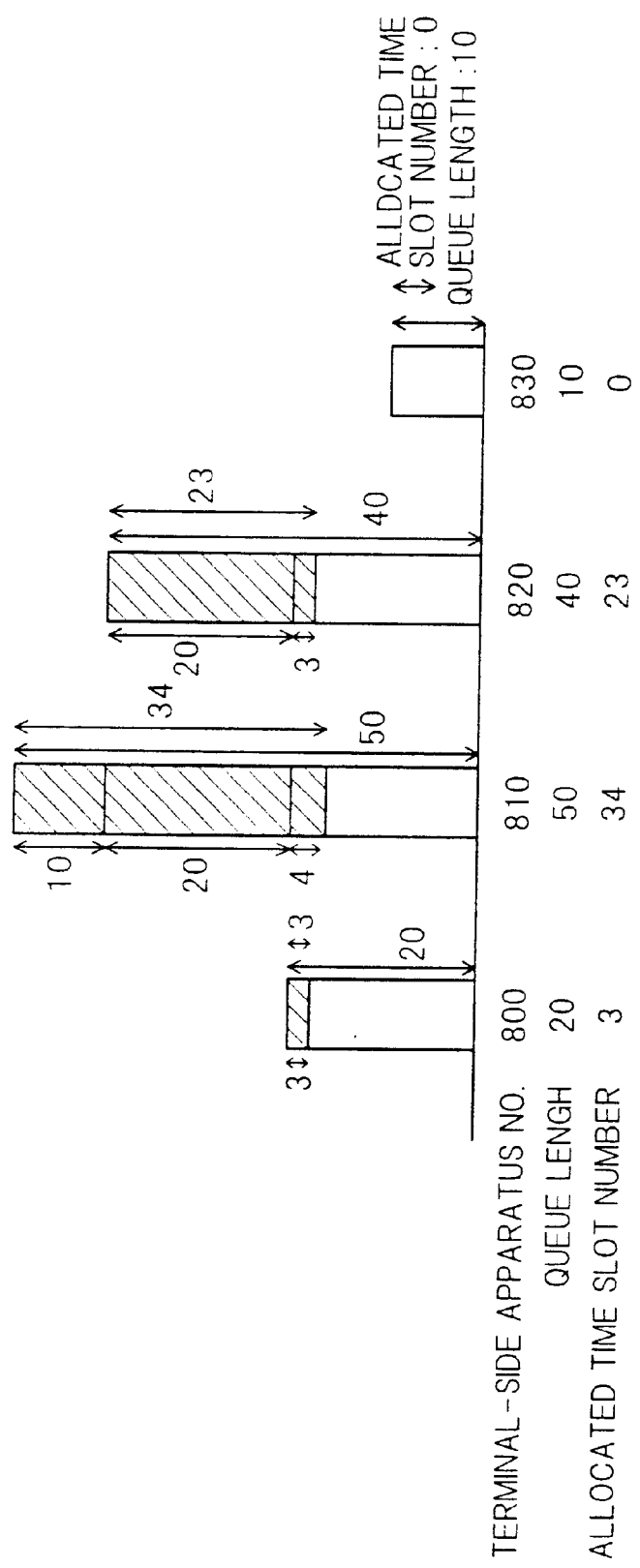
FIG. 4 is a figure showing the time slot allocation method when the Queue Length Averaging Method of this invention is applied.

With reference to FIG. 4, the Queue Averaging Method is described. In the embodiment of FIG. 4, it is assumed that all the terminal-side apparatus are object terminal-side apparatus for allocation. In FIG. 4, the necessary buffer capacity reduction type time slot allocation control function 141, at first allocates 10 time slots to the terminal-side apparatus 810 having the buffer 801 of the longest Queue length. Then, it allocates 20 time slots respectively to the terminal devices 810, 820 having the buffer 801 of the longest and the second longest Queue lengths. Further, it allocates 4, 3, and 3 time slots respectively to the terminal-side apparatus 810, 820, and 800 having the buffer 801 of the longest, the second longest, and the third longest Queue lengths. At this point, the total of time slots allocated is equal to the total time slot number 60, allocation is terminated. Thus, the time slots allocated to each of the terminal-side apparatus 800~830 are 3, 34, 23, 0 respectively. And when the necessary buffer capacity reduction type time slot allocation control function 141 uses the Queue Length Averaging Method with part of the terminal-side apparatus 800~830 as objects for time slot allocation, said allocation method is applied only to the object terminal-side apparatus for allocation.

When the necessary buffer capacity reduction type time slot allocation control function 141 uses the Queue Length Averaging Method in this way, an increase in the Queue length of the object terminal-side apparatus for allocation with long Queue length 800~830 may be controlled by allocating time slots in the descending order of the Queue lengths among the object terminal-side apparatus for allocation. Further, by allocating time slots so that Queue lengths among the object terminal-side apparatus for allocation maybe be constant as nearly as possible, Queue lengths among the object terminal-side apparatus for allocation become less scattered, and the necessary buffer capacity for each buffer 801 may be reduced.

Figure 5:
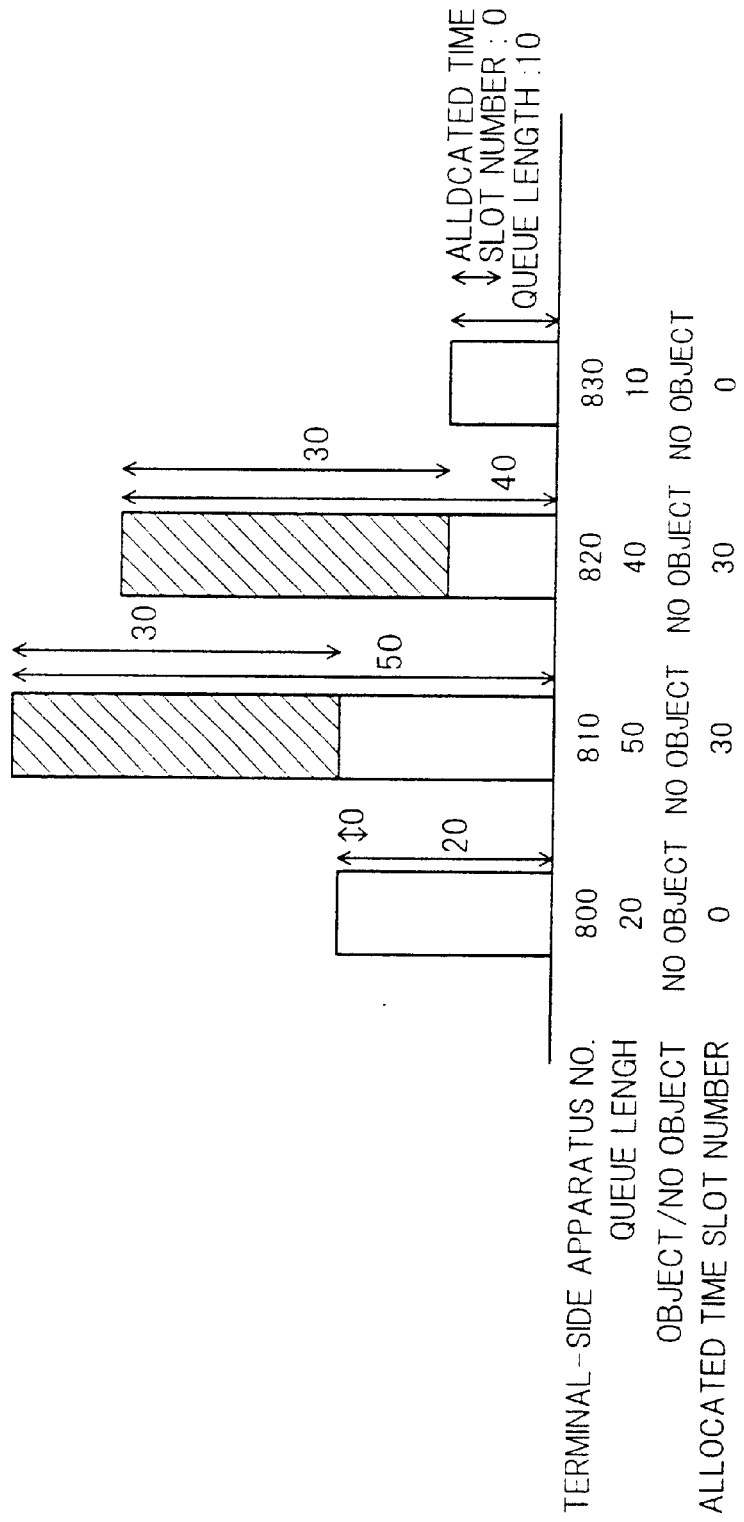
FIG. 5 is a figure showing the time slot allocation method when the object terminal-devices for allocation are limited, and the Equal Division Allocation Method is applied in this invention.

Next, with reference to FIG. 5, the Equal Division Allocation Method is described. In the embodiment of FIG. 5, a case is shown, in which the terminal-side apparatus 810, 820 are the object terminal-side apparatus for allocation. In this case, 30 time slots out of 60 in the total number are allocated to the object terminal-side apparatus for allocation 810, 820 respectively. Thus, the time slots allocated to each of the terminal-side apparatus 800–830 are 0, 30, 30, 0 respectively. In ways to limit the object terminal-side apparatus for allocation, there are, one method wherein among the terminal-side apparatus 800–830, those within a certain number, having the buffer 801 in the descending order of the Queue lengths are made the object terminal-side apparatus for allocation, another method wherein among the terminal-side apparatus 800–830, those having the buffer 801 with Queue length longer than a specified threshold value are made the object terminal-side apparatus for allocation, or one another method wherein among the terminal-side apparatus 800–830 having the buffer 801 with Queue length longer than a specified threshold value, those within a certain number, having the buffer 801 in the descending order of the Queue lengths are made the object terminal-side apparatus for allocation.

In this way, when the necessary buffer capacity reduction type time slot allocation control function 141 limits object terminal-side apparatus for allocation to those of the terminal-side apparatus 800–830, having the buffer 801 of long Queue length, to allocate time slots by the Equal Allocation Method, time slots are allocated only to those of the terminal-side apparatus with long Queue length, and an increase in the Queue length of the terminal-side apparatus with long Queue length is controlled to result in the reduction of the necessary buffer capacity.

Figure 6:
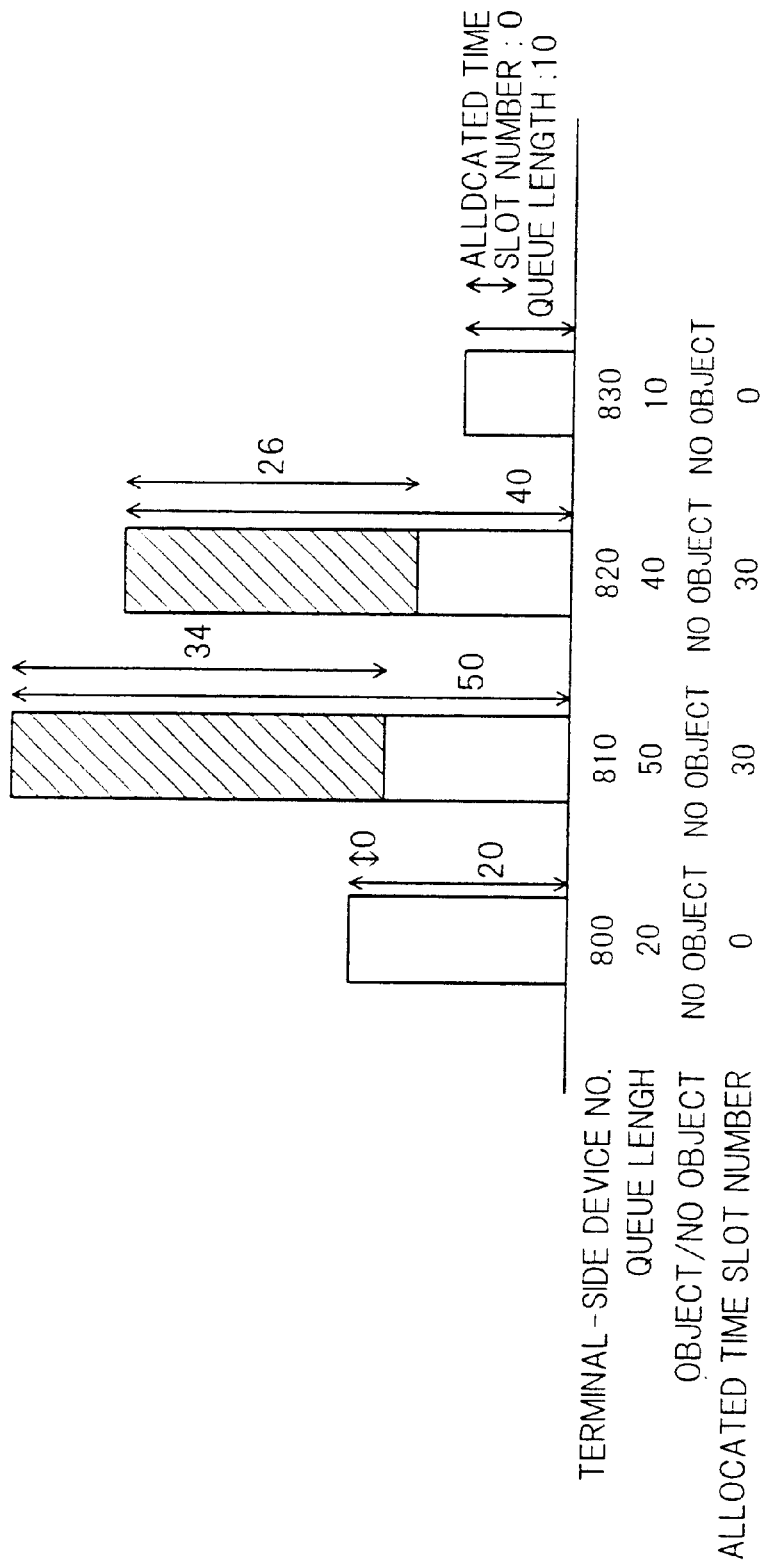
FIG. 6 is a figure showing the time slot allocation method when the object terminal-devices for allocation are limited, and the Queue Length Proportional Allocation Method of this invention is applied.

Next, with reference to FIG. 6, the Queue Length Proportional Allocation Method is described. In the embodiment of FIG. 6, it is assumed that the terminal-side apparatus 810, 820 are the object terminal-side apparatus for allocation. In this case, time slots of the total number of 60 are allocated to the object terminal-side apparatus 810, 820 in proportion to the Queue length ratio, 50:40. Thus, to the object terminal-side apparatus 810, 820, time slots of 34, 26 are allocated, and the time slots allocated to each of the terminal-side apparatus turn out to be 0, 34, 26, and 0. There are three methods for limiting the object terminal-side apparatus for allocation, as described in the Equal Division Allocation Method.

When, as stated above, the necessary buffer capacity reduction type time slot allocation control function 141 limits the object terminal-side apparatus for allocation to those of the terminal-side apparatus 800–830, having long Queue lengths so as to allocate time slots by the Queue Length Proportional Allocation Method, the necessary buffer capacity may be reduced by the same reason for the Equal Division Allocation Method.

Also, by dividing the total time slots allocated to each of the terminal-side apparatus 800–830 into plural time slot groups, and applying the three time slot allocation methods of this invention to each of the time slot groups, for each of the terminal-side apparatus 800–830, at the same time, the necessary buffer capacity of the buffer 801 may be reduced, and the minimum number of time slot allocation may be reserved, the variance of the cell delays in the buffer 801 being reduced.

Figure 7:
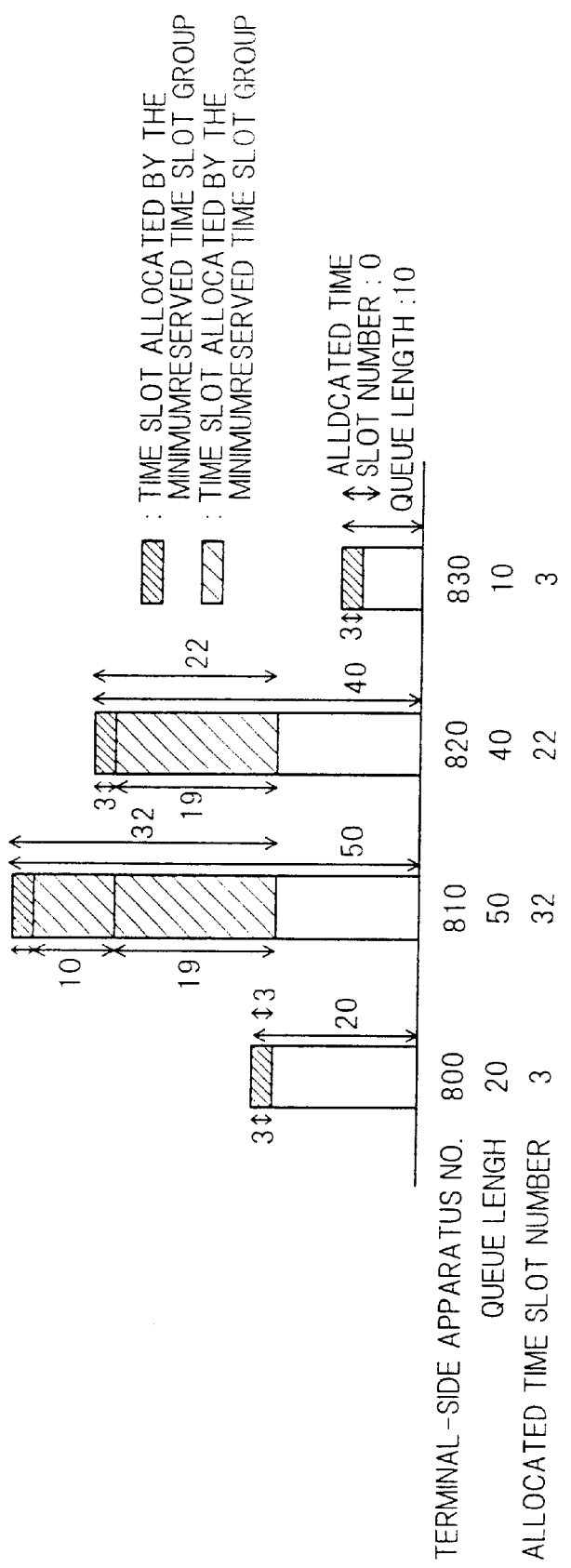
FIG. 7 is a figure showing the time slot allocation method the total time slots are divided into two time slot groups in this invention.

As one example, with reference to FIG. 7, a case is described, where the necessary buffer capacity reduction type time slot allocation control function 141 aims at reserving the minimum number of time slot allocation and reducing the necessary buffer capacity. In the case of FIG. 7, the necessary buffer capacity reduction type time slot allocation control function 141, applies the Equal Division Allocation Method to the time slot group for reserving the minimum number of time slot allocation (henceforth, described as the minimum reserved time slot group), and the Queue Length Averaging Method to the time slot group for reducing the necessary buffer capacity (henceforth, described as the necessary buffer capacity reduced time slot group). In FIG. 7, the necessary buffer capacity reduction type time slot allocation control function 141 divides the total time slots of 60 into the time slots of 12 for the minimum reserved time slot group and the time slots of 48 for the necessary buffer capacity reduced time slot group. Also, as for the conditions of the Queue length, etc., as is FIG. 6, it is assumed that all the terminal-side apparatus 800–830 are object terminal-side apparatus for allocation. In this case, the necessary buffer capacity reduction type time slot allocation control function 141 allocates 3 time slots out of 12 the time slots in the minimum reserved time slot group to each of the terminal-side apparatus 800–830, and allocates 48 time slots in the necessary buffer capacity reduced time slot group according to the Queue Length Averaging Method. According to the Queue Length Averaging Method, to each of the terminal-side apparatus, time slots of 0, 29, 19, and 0 are allocated respectively. Then, the necessary buffer capacity reduction type time slot allocation control function 141 adds time slots allocated by the minimum reserved time slot group and those allocated by the necessary buffer capacity reduced time slot group with respect to each of the terminal-side apparatus 800–830. As a result, time slots allocated to each of the terminal-side apparatus 800–830 turn out to be 3, 32, 22, and 3 respectively.

As describe above, when the necessary buffer capacity reduction type time slot allocation control function 141 divides the total time slots into two time slot groups, the necessary buffer is reduced by that, in the minimum reserved time slot group applied by the Equal Division Allocation Method, the minimum number of time allocation is reserved for all the terminal-side apparatus 800–830, and in the necessary buffer capacity reduced time slot group applied by the Queue Length Averaging Method, each Queue length is made constant as nearly as possible.

Next, with reference to drawings, the second embodiment will be described.

Figure 8:
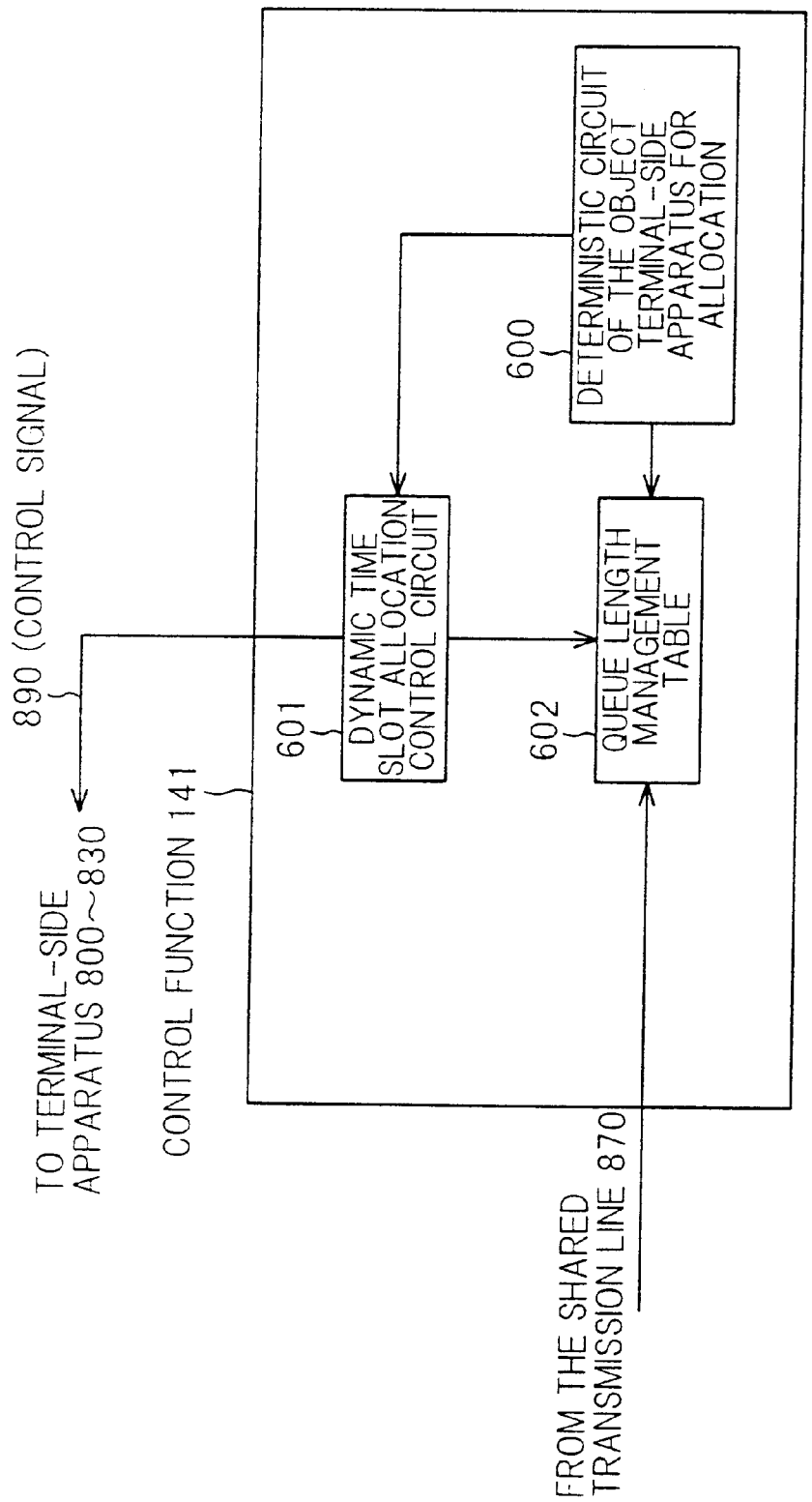
FIG. 8 is a structural diagram of the necessary buffer-capacity reduction-type time slot allocation control function of this invention.

With reference to FIG. 8, a structure example of the necessary buffer capacity reduction type time slot allocation control function 141 is described so as to realize the time slot allocation method in the first embodiment.

The necessary buffer capacity reduction type time slot allocation control function 141 shown in FIG. 8 comprises the deterministic circuit of the object terminal-side apparatus for allocation 600, the dynamic time slot allocation control circuit 601, and the Queue length management table 602.

The deterministic circuit of the object terminal-side apparatus for allocation 600, when timing for changing time slot allocation arrives, refers to the Queue length management table 602 to get the Queue length information of the buffer 801 of the terminal-side apparatus 800~830. Here, in the Queue length management table 602, the Queue length information of the buffer 801 of the terminal-side apparatus 800~830 is stored, which is updated when new Queue length information is input via the shared transmission line 870. The deterministic circuit of the object terminal-side apparatus for allocation 600, getting the Queue length information of the buffer 801 of the terminal-side apparatus 800~830, determines the object terminal-side apparatus for allocation on the basis of the Queue length information and reports information regarding the object terminal-devices for allocation to the dynamic time slot allocation control circuit 601. The dynamic time slot allocation control circuit 601, receiving a report from the deterministic circuit of the object terminal-side apparatus for allocation 600, refers to the Queue length management table 602 to get the Queue length information of each object terminal-side apparatus for allocation, and allocates time slots based on it. Then, it reports the information regarding the allocated time slots to the terminal-side apparatus 800~830 by the control signal 890. Here, the dynamic time slot allocation control circuit 601 executes either the Equal Division Allocation Method, the Queue Length Proportional Method, or the Queue Length Averaging Method, as described in the first embodiment. The deterministic circuit of the object terminal-side apparatus for allocation 600 limits the object terminal-devices for allocation to those of the terminal-devices 800~830 within a certain number in their descending order, to those of the terminal-side apparatus 800~830 having the buffer 801 of Queue length longer than a threshold value, or to those within a certain number in the descending order of the Queue lengths among the terminal-side apparatus 800~830 having the buffer 801 of the Queue length longer than a threshold value. Further, the deterministic circuit of the object terminal-side apparatus for allocation 600 makes all the terminal-side apparatus 800~830 object terminal-side apparatus for allocation, only when the dynamic time slot allocation control circuit 601 executes the Queue Length Averaging Allocation Method. By the structure described as above, the necessary buffer capacity reduction type time slot allocation control function 141 provides function to realize the time slot allocation control method in the first (second) embodiment.

Next, with reference to drawings, the third embodiment will be described.

As described in the first embodiment, the total time slots are divided into plural time slot groups, and when the time slot allocation methods of this invention are independently applied to each time slot group, an example of the structure of the necessary buffer capacity reduction type time slot allocation control function 141 is described with reference to FIG. 9. The example in FIG. 9 is that of the structure of the necessary buffer capacity reduction type time slot allocation control function 141 where the Equal Division Allocation Method is applied to the minimum reserved time slot group, and the Queue Length Averaging Method to the necessary buffer capacity reduced time slot group.

Figure 9:
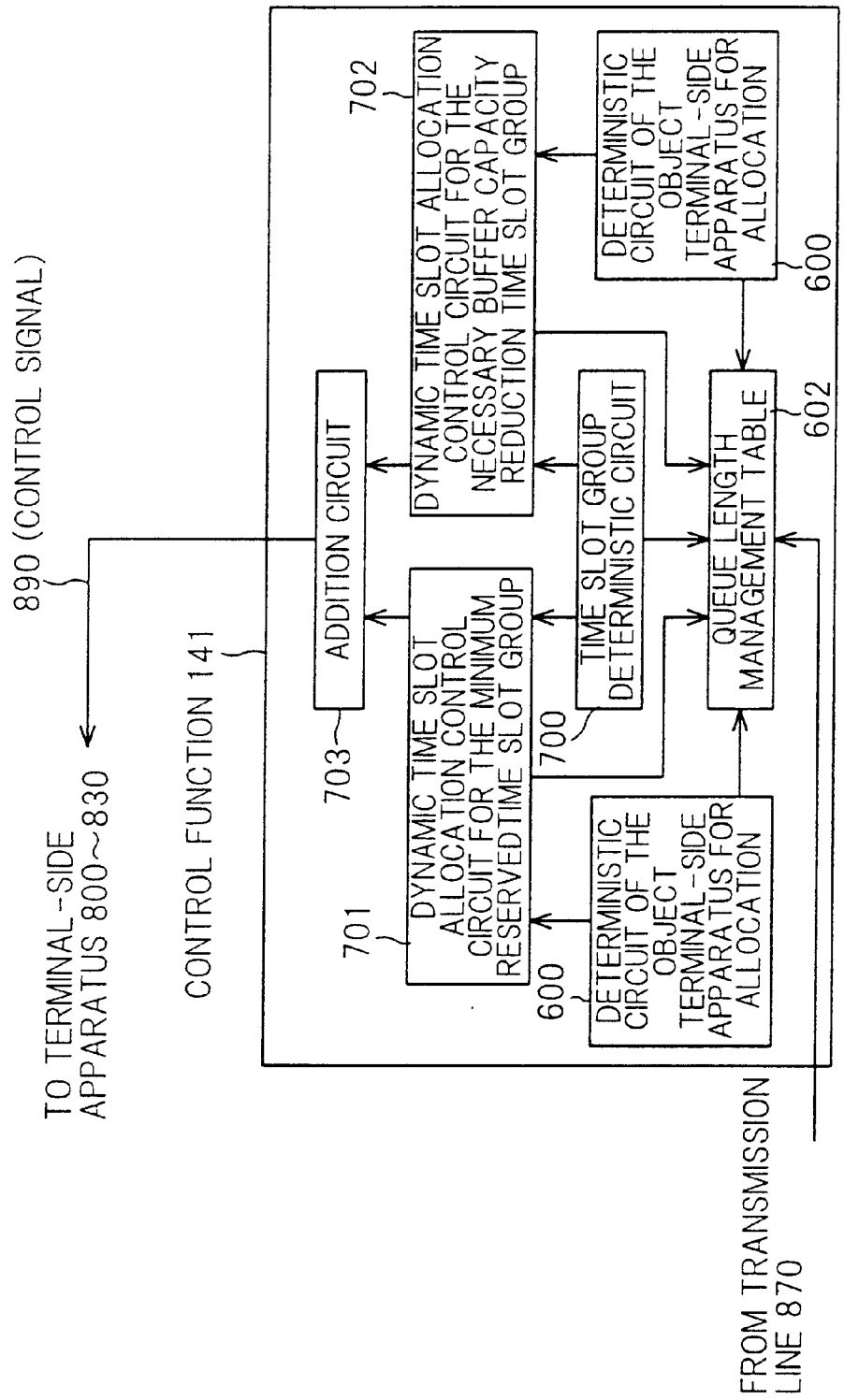
FIG. 9 is another structural diagram of the necessary buffer-capacity reduction-type time slot allocation control function of this invention.

In FIG. 9, the necessary buffer capacity reduction type time slot allocation control function 141 comprises the time slot group deterministic circuit 700, the dynamic time slot allocation control circuit for the minimum reserved time slot group 701, the dynamic time slot allocation control circuit for the necessary buffer capacity reduction time slot group 702, the addition circuit 703, the deterministic circuit of the object terminal-side apparatus for allocation 600, and the Queue length management table 602. The dynamic time slot allocation control circuit for the minimum reserved time slot group 701 and the dynamic time slot allocation control circuit for the necessary buffer capacity reduction time slot group 702 provides the similar function as that of the dynamic time slot allocation control circuit 601 in FIG. 8. In the following description, only differences from the FIG. 8 are described, and description about the same functions is omitted.

The time slot group deterministic circuit 700, when timing for changing time slot allocation arrives, divides the total time slots into the minimum reserved time slot group and the shared transmission line effective utilization time slot group for management. As for this division, there are, one case where division is made fixedly according to a predetermined division ratio, and the other where it is made according to the Queue length information or other information of the buffer of the terminal-side apparatus 800~830 referenced from the Queue length management table 602. Then it reports to the dynamic time slot allocation control circuit for the minimum reserved time slot group 701, and to the dynamic time slot allocation control circuit for the necessary buffer capacity reduction time slot group 702, their respective allocated time slot numbers. The dynamic time slot allocation control circuit for the minimum reserved time slot group 701, and the dynamic time slot allocation control circuit for the necessary buffer capacity reduction time slot group 702, receiving the report, allocates time slots to the object terminal-side apparatus for allocation reported from the deterministic circuit of the object terminal-side apparatus for allocation 600, and reports the results to the addition circuit 703. The addition circuit 703, receiving the report, and adding the respective results, determines time slots to allocate to each of the terminal-side apparatus 800~830, and reports the information to each of the terminal-side apparatus 800~830. According to the structure described above, the necessary buffer capacity reduction type time slot allocation control function 141 divides the total time slots into the minimum reserved time slot group and the shared transmission line effective utilization time slot group, and may allocates time slots to each of the time slot groups by applying independently the time slot allocation methods of this invention.

As described above, the effect of the time slot allocation methods of this invention is that the necessary terminal capacity of the buffer in the terminal-side apparatus may be reduced.

In other words, when the Queue Length Averaging Method of this invention is used, the network-side apparatus allocates time slots so that they may be allocated to the terminal-side apparatus, having the buffer in the descending order of the Queue lengths, and that the values of Queue lengths minus the allocated time slots among the object terminal-side apparatus may be constant as nearly as possible, or the variance of Queue lengths may be minimized. Accordingly, an increase in the Queue lengths of the terminal-side apparatus having the buffer of long Queue lengths may be controlled, and further, since one can reduce the scattering of Queue lengths among the terminal-side apparatus, one can reduce the necessary buffer capacity of each buffer.

Also, when the object terminal-side apparatus for allocation are limited to the terminal-side apparatus having the buffer of long Queue lengths, time slots are allocated only to the terminal devices having long Queue lengths. Accordingly, an increase in the Queue lengths of the terminal-side apparatus having long Queue lengths is controlled, resulting in reduction of the necessary buffer capacity of each buffer.

Further, according to the time slot allocation methods of the invention, it is possible to satisfy such objects at the same time, as reduction of the necessary buffer capacity of the buffer for each terminal device, reservation of the minimum time slot allocation, and reduction of the variance of cell delays in the buffer.

In other words, the necessary buffer-capacity reduction-type time slot allocation control function of the network-side apparatus in this invention divides the total time slots into plural time slot groups, and applies the time slot allocation methods of this invention to each group. Here, by applying the three methods of the invention to part of the time slot groups, the buffer capacity of each buffer may be reduced. And by applying the Equal Division Allocation Method or the Queue Length Proportional Allocation Method of the invention to other part of time slot groups, the minimum time slot allocation may be reserved. Also, by reserving the minimum time slot allocation, each terminal-side apparatus may output cells at finite intervals so as to reduce the variance of cell delays in the buffer.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A packet communication system, wherein plural terminal-side apparatus and a network-side apparatus are connected, sharing physical media, said network-side apparatus allocating time slots to at least one of said terminal-side apparatus, and said terminal-side apparatus transferring packets to the physical media by using said time slots, each of said terminal-side apparatus comprising:

a buffer means for storing packets input from plural terminals connected and a packet number report means which monitors the number of packets presently stored in said buffer means and reports said packet number information to said network-side apparatus, and said network-side apparatus comprising a time slot allocation control means for allocating time slots to each said terminal-side apparatus on the basis of stored packet information from the packet number report means of said terminal devices, and said time slot allocation control means allocates time slots by allocating time slots so that the stored packet number minus the number of time slots allocated to each may approach a specified value.

2. A packet communication system, wherein plural terminal-side apparatus and a network-side apparatus are connected, sharing physical media, said network-side apparatus allocating time slots to at least one said terminal-side apparatus, and said terminal-side apparatus transferring packets to the physical media by using said time slots, each of said terminal-side apparatus comprising:

a buffer means for storing packets input from plural terminals connected and a packet number report means which monitors the number of packets presently stored in said buffer means and reports said packet number information to said network-side apparatus, and said network-side apparatus comprising a time slot allocation control means for allocating time slots to each said terminal-side apparatus on the basis of stored packet information from the packet number report means of said terminal devices, and said time slot allocation control means allocates time slots by allocating time slots so that the variance of the stored packet number minus the number of time slots allocated to each may be minimized.

3. A packet communication system, wherein plural terminal-side apparatus and a network-side apparatus are connected, sharing physical media, said network-side apparatus allocating time slots to at least one of said terminal-side apparatus, and said terminal-side apparatus transferring packets to the physical media by using said time slots, each of said terminal-side apparatus comprising:

a buffer means for storing packets input from plural terminals connected and a packet number report means which monitors the number of packets presently stored in said buffer means and reports said packet number information to said network-side apparatus, and said network-side apparatus comprising a time slot allocation control means for allocating time slots to each said terminal-side apparatus on the basis of stored packet information from the packet number report means of said terminal device, and said time slot allocation control means divides the total time slots allocated for said terminal-side apparatus into time slot groups, allocating time slots so that in each said time slot group, the stored packet number in said terminal-side apparatus minus the number of time slots allocated to each may approach a specified value, adding each said allocated time slot in each said terminal-side apparatus to determine the allocated time slots in said terminal-side apparatus.

4. A packet communication system, wherein plural terminal-side apparatus and a network-side apparatus are connected, sharing physical media, said network-side apparatus allocating time slots to at least one said terminal-side apparatus, and said terminal-side apparatus transferring packets to the physical media by using said time slots, each of said terminal-side apparatus comprising:

a buffer means for storing packets input from plural terminals connected and a packet number report means which monitors the number of packets presently stored in said buffer means and reports said packet number information to said network-side apparatus, and said network-side apparatus comprising a time slot allocation control means for allocating time slots to each said terminal-side apparatus on the basis of stored packet information from the packet number report means of said terminal devices, and said time slot allocation control means divides the total time slots allocated for said terminal-side apparatus into time slot groups, allocating time slots so that in each said time slot group, the variance of the stored packet number in said terminal-side apparatus minus the number of time slots allocated to each may be minimized, adding each of said allocated time slots in each said terminal-side apparatus to determine the allocated time slots in said terminal-side apparatus.

5. A packet communication system, wherein plural terminal-side apparatus and a network-side apparatus are connected, sharing physical media, said network-side apparatus allocating time slots to at least one said terminal-side apparatus, and said terminal-side apparatus transferring packets to the physical media by using said time slots, each of said terminal-side apparatus comprising:

a buffer means for storing packets input from plural terminals connected and a packet number report means which monitors the number of packets presently stored in said buffer means and reports said packet number information to said network-side apparatus, and said network-side apparatus comprising a time slot allocation control means for allocating time slots to each said terminal-side apparatus on the basis of stored packet information from the packet number report means of said terminal device, and said time slot allocation control means divides the total time slots allocated to said terminal-side apparatus into plural slot groups, allocates time slots so that in at least one of said time slot groups, the stored packet numbers in said terminal-side apparatus minus the time slot numbers allocated may approach a specified value, and in the other time slot groups among said time slot groups, the variance of the stored packet numbers in said terminal-side apparatus minus the time slot numbers allocated may be minimized, adding each said allocated time slot in each said terminal-side apparatus to determine the allocated time slots in said terminal-side apparatus.

6. A packet communication system defined in claim 1, wherein in said time slot allocation control means, time slots are allocated in the descending order of stored packet numbers in the terminal-side apparatus when time slots are allocated.

7. A packet communication system defined in claim 1, wherein in said time slot allocation control means, terminal-side apparatus for time slot allocation are limited to part of them when time slots are allocated.

8. A packet communication system defined in claim 1, wherein when said time slot allocation control means are limited to part of terminal-side apparatus for allocation, terminal-side apparatus which store packets more than a predetermined threshold value are chosen.

9. A packet communication system defined in claims 1, wherein when said time slot allocation control means are limited to part of terminal-side apparatus for allocation, a predetermined number of terminal-side apparatus are chosen in the descending order of stored packet numbers.

10. A packet communication system defined in claims 1, wherein when said time slot allocation control means are limited to part of terminal-side apparatus for allocation, a predetermined number of terminal-side apparatus are chosen in the descending order of stored packet numbers among those which store packets more than a predetermined threshold value.

11. A packet communication system defined in claim 1, wherein when said time slot allocation control means are limited to part of terminal-side apparatus for allocation, among a predetermined number of terminal-side apparatus in the descending order of stored packet number, terminal-side apparatus with packets more than a predetermined threshold value are chosen.

12. A packet communication system defined in claim 1, wherein said packets are cells used in the asynchronous transfer mode.

13. A network-side apparatus wherein it is provided with a stored packet number management table which manages the stored packet number information reported from plural terminal-side apparatus and updates the stored packet number information under management when new packet number information is reported from each said terminal-side apparatus, a circuit for determining terminal-side apparatus for allocation, which gets the stored packet information of each said terminal device with reference to said stored packet number management table when timing arrives for changing time slot allocation and limits terminal-side apparatus for allocation on the basis of the acquired stored packet number information, and a time slot allocation control circuit which when the information of the terminal-side apparatus for allocation is received from said circuit for determining terminal-side apparatus for allocation, gets the stored packet number information of the terminal-side apparatus for allocation with reference to said stored packet number management table, allocates time slots to the terminal-side apparatus for allocation based on the acquired stored packet number information, and reports the allocated time slot information to the terminal-side apparatus.

14. A network-side apparatus defined in claim 13, wherein the terminal-side apparatus stored with packets more than a predetermined threshold value are chosen, when said circuit for determining terminal-side apparatus for allocation limits terminal-side apparatus for allocation to part of terminal-side apparatus.

15. A network-side apparatus defined in claim 13, wherein a predetermined number of terminal-side apparatus are chosen in descending order of numbers of stored packets, when said circuit for determining terminal-side apparatus for allocation limits terminal-side apparatus for allocation to part of terminal-side apparatus.

16. A network-side apparatus defined in claim 13, wherein among the terminal-side apparatus stored with packets more than a predetermined threshold value, a predetermined number of terminal-side apparatus are chosen in the descending order of stored packet numbers, when said circuit for determining terminal-side apparatus for allocation limits terminal-side apparatus for allocation to part of terminal-side apparatus.

17. A network-side apparatus defined in claim 13, characterized in that among a predetermined number of the terminal-side apparatus in the descending order of stored packet numbers, terminal-side apparatus stored with more than a predetermined threshold value are chosen when said circuit for determining terminal-side apparatus for allocation limits terminal-side apparatus for allocation to part of terminal-side apparatus.

18. A network-side apparatus defined in claim 13, wherein said time slot allocation control circuit allocates time slots so that values of the stored packet numbers of said terminal-side apparatus minus the time slot numbers allocated may approach a specified value.

19. A network-side apparatus defined in claim 13, wherein said time slot allocation control circuit allocates time slots so that the variance of the stored packet numbers of said terminal-side apparatus minus the time slot numbers allocated may be minimized.

20. A network-side apparatus defined in claim 13, wherein said time slot allocation control circuit divides the total time slots allocated to said terminal-side apparatus into plural time slot groups and allocates time slots so that in each of said time slot group the stored packet numbers of said terminal-side apparatus minus the numbers of time slots allocated may approach a specified value, determining the allocated time slots for said terminal-side apparatus by adding each said time slot allocated to each said terminal device.

21. A network-side apparatus defined in claim 13, wherein said time slot allocation control circuit divides the total time slots allocated to said terminal-side apparatus into plural time slot groups and allocates time slots so that in each of said time slot group the variance of stored packet numbers of said terminal-side apparatus minus the numbers of time slots allocated may be minimized, determining the allocated time slots for said terminal-side apparatus by adding each said time slot allocated to each said terminal device.

22. A network-side apparatus defined in claim 13, wherein said time slot allocation control circuit divides the total time slots allocated to said terminal-side apparatus into plural time slot groups, and allocates time slots so that in at least one group of said time slot groups, the stored packet numbers of said terminal-side apparatus minus the numbers of time slots allocated may approach a specified value, and in the other time slot groups of said time slot groups, the variance of stored packet numbers of said terminal-side apparatus minus the numbers of time slots allocated may be minimized, determining the allocated time slots for said terminal-side apparatus by adding each of said time slots allocated to each of said terminal devices.

23. A network-side apparatus defined in claim 18, wherein said time slot allocation control circuit allocates time slots to terminal-side apparatus in the descending order of stored packet numbers.

24. A network-side apparatus defined in claim 13, further comprising:

a time slot group deterministic circuit which divides the total time slots allocated to said terminal-side apparatus into plural time slot groups to manage them, and an addition circuit which inputs the results of time slot allocation from plural number of said time slot allocation control circuits, adds each allocation result, reporting the added results to each said terminal-side apparatus.

25. A network-side apparatus defined in claim 13, wherein said packets are cells used in the asynchronous transfer mode.

26. A time slot allocation control method wherein plural terminal-side apparatus and network-side apparatus are connected sharing physical media and said network-side apparatus determines the time slot numbers allocated to said terminal-side apparatus, said terminal-side apparatus seek the stored packet numbers in terminal-side apparatus, and said network-side apparatus seeks the time slot numbers for allocation, and time slots are so allocated that said stored packet number minus the time slot number allocated to each may approach a specified value.

27. A time slot allocation control method wherein plural terminal-side apparatus and a network-side apparatus are connected, sharing physical media and said network-side apparatus determines the time slot numbers allocated to said terminal-side apparatus, and said terminal-side apparatus seek the stored packet numbers in the terminal-side apparatus, and said network-side apparatus seeks the time slot numbers, and time slots are so allocated that the variance of said stored packet numbers minus the time slot numbers allocated to each may be minimized.

28. A time slot allocation control method wherein plural terminal-side apparatus and network-side apparatus are connected, sharing physical media, said network-side apparatus determining the time slot numbers allocated to said terminal-side apparatus, said terminal-side apparatus seek the stored packet numbers of terminal-side apparatus, and said network-side apparatus seeks the time slot numbers, and the total time slots are divided into plural time slot groups, and in each said time slot group, time slots are so allocated that the stored packet number of said terminal-side apparatus minus the time slot number allocated to each may approach a specified value, and the allocated time slots for said terminal-side apparatus are determined by adding each said time slot allocated to each said terminal device.

29. A time slot allocation control method wherein plural terminal-side apparatus and network-side apparatus are connected, sharing physical media, said network-side apparatus determining the time slot number allocated to said terminal-side apparatus, said terminal-side apparatus seek the stored packet numbers of terminal-side apparatus, and said network-side apparatus seeks the time slot numbers, and the total time slots are divided into plural time slot groups, and in each said time slot group, time slots are so allocated that the variance of the stored packet numbers of said terminal-side apparatus minus the time slot numbers allocated to each may be minimized, and the allocated time slots for said terminal-side apparatus are determined by adding each said time slot allocated to each said terminal device.

30. A time slot allocation control method wherein plural terminal-side apparatus and network-side apparatus are connected, sharing physical media, said network-side apparatus determining the time slot number allocated to said terminal-side apparatus, said terminal-side apparatus seek the stored packet numbers of terminal-side apparatus, and said network-side apparatus seeks the time slot numbers, and the total time slots are divided into plural time slot groups, and in at least one of said time slot groups, time slots are so allocated that stored packet number of said terminal-side apparatus minus the time slot number allocated to each may approach a specified value, and in the other time slot groups of said time slot groups, time slots are so allocated that the variance of stored packet numbers of said terminal-side apparatus minus the time slot numbers allocated to each may be minimized, and the allocated time slots for said terminal-side apparatus are determined by adding each said time slot allocated to each said terminal device.

31. A time slot allocation control method defined in claim 26, wherein time slots are allocated in descending order of number of stored packets in the terminal-side apparatus.

32. A time slot allocation control method defined in claim 26, wherein said packet allocation is limited to the terminal-side apparatus storing packets more than a preset threshold value.

33. A time slot allocation control method defined in claim 26, wherein said packet allocation is limited to the terminal-side apparatus of a predetermined number in the descending order of stored packet numbers.

34. A time slot allocation control method defined in claim 26, wherein among the terminal-side apparatus storing packets more than a predetermined threshold value, terminal devices for said packet allocation are limited to those of a predetermined number in the descending order of stored packet numbers.

35. A time slot allocation control method defined in claim 26, wherein among the terminal-side apparatus of a predetermined number in the descending order of stored packet number, terminal-side apparatus for said packet allocation are limited to those storing packets more than a predetermined threshold value.

36. A time slot allocation control method defined in claim 26, wherein those said packets are cells used in the asynchronous transfer mode.

* * * * *